June 16, 1953 — J. G. ZUMMACH — 2,641,823
WORK HOLDER
Filed Sept. 1, 1949 — 2 Sheets-Sheet 1
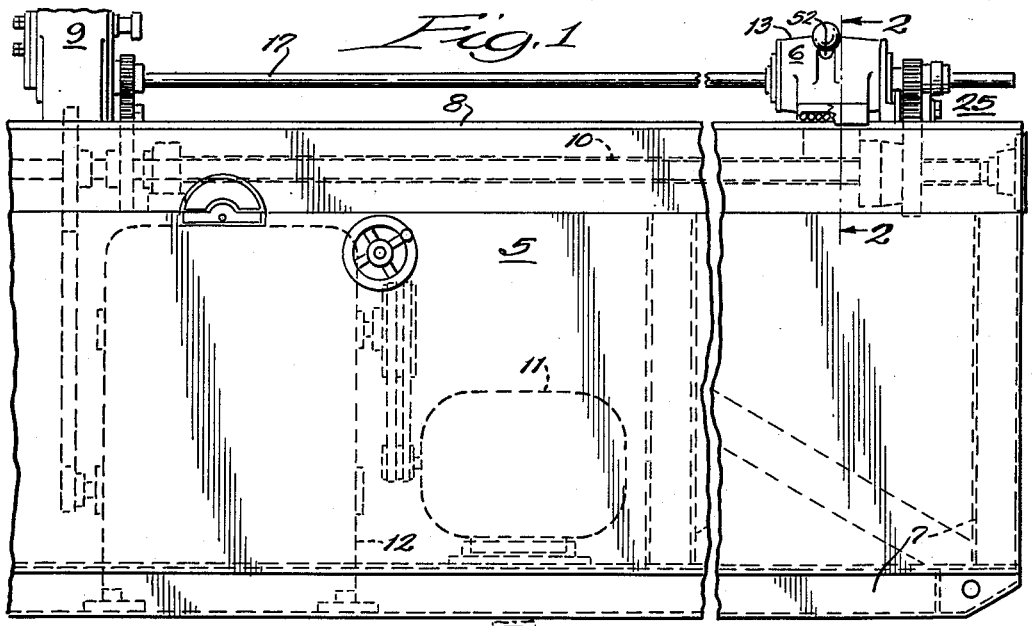
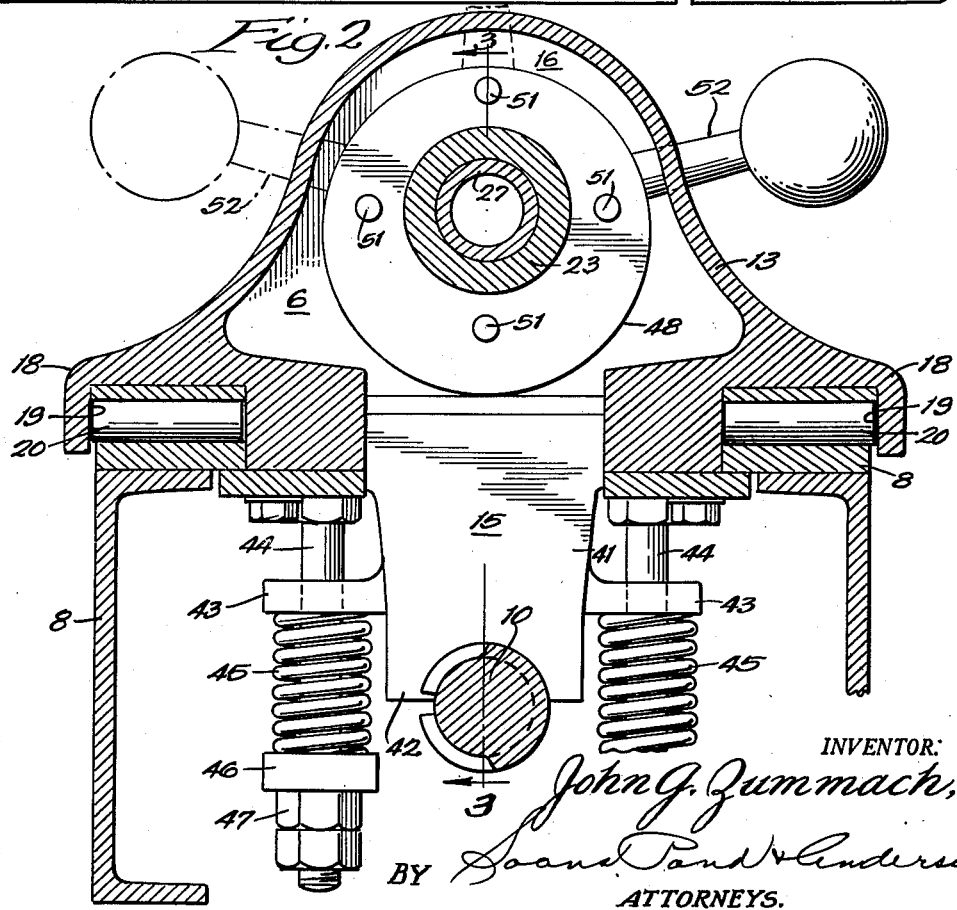
INVENTOR:
John G. Zummach,
BY Soans Pond & Anderson
ATTORNEYS.

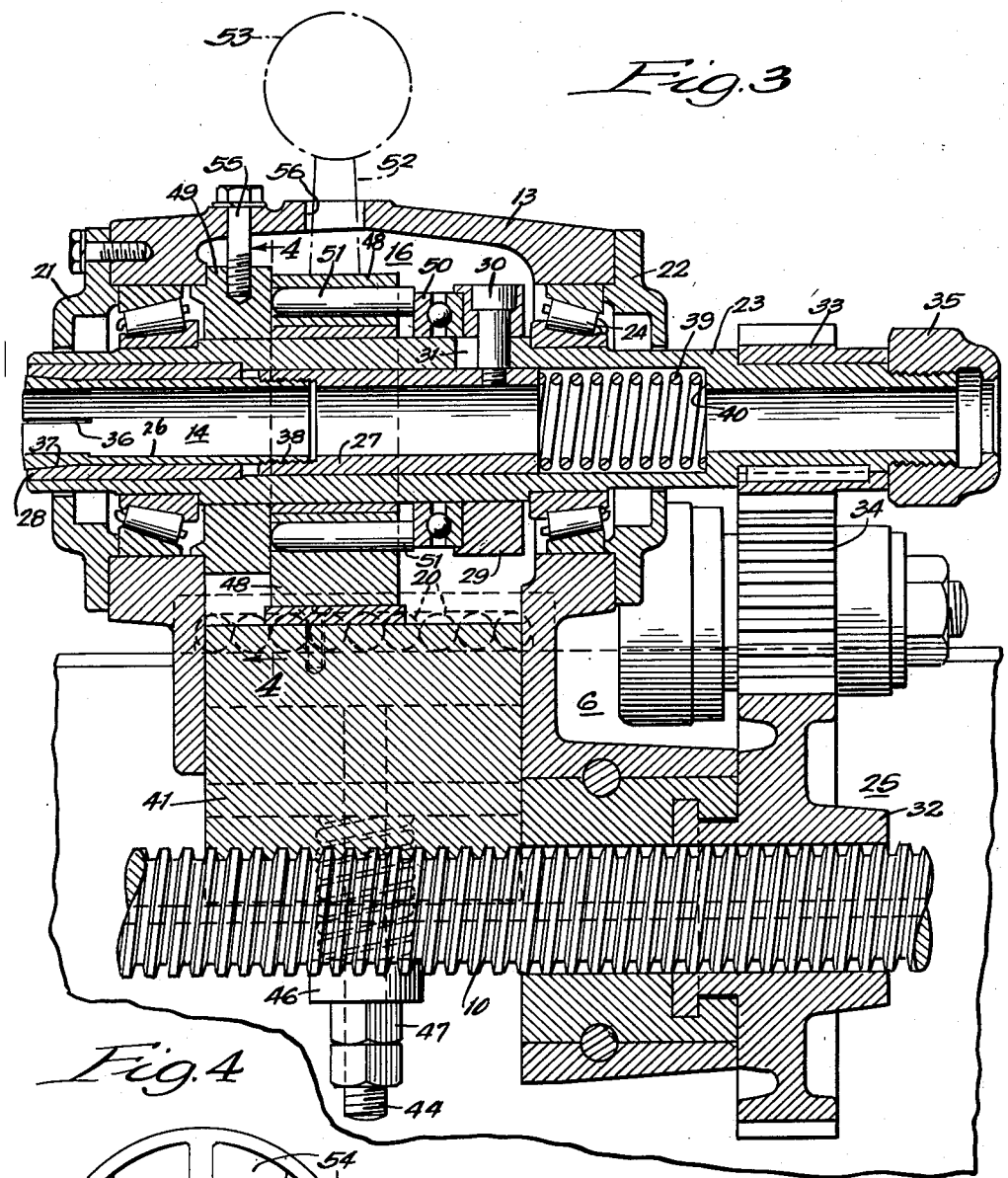
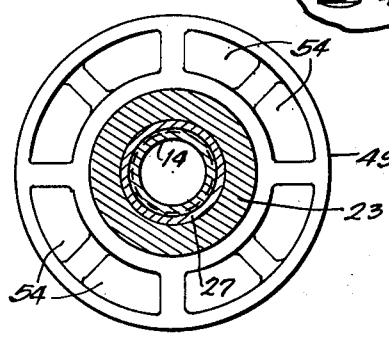

Patented June 16, 1953

2,641,823

UNITED STATES PATENT OFFICE 2,641,823

WORK HOLDER

John G. Zummach, Brownsville, Tex., assignor to Young Radiator Company, Racine, Wis., a corporation of Wisconsin Application September 1, 1949, Serial No. 113,567

7 Claims. (Cl. 29—59)

The main objects of this invention are to provide an improved form of work holder for machines where the work is advanced for action thereon by a tool; to provide a work holder of this kind having improved means for simultaneously clamping the work to the holder and connecting the holder to the work-advancing mechanism; to provide improved means for normally retracting the aforesaid means; and to provide an improved work holder of this kind which is economical to manufacture and effective in operation.

In the accompanying drawings:

Fig. 1 is a side elevation of a machine (intermediate and end portions being omitted) whereon is arranged a work holder constructed in accordance with this invention. The view shows the head stock and the power unit whereby the work holder is advanced toward the tool-supporting head stock and the work is simultaneously rotated;

Fig. 2 is an enlarged cross-sectional view of this improved work holder, taken on the plane of the line 2—2 of Fig. 1;

Fig. 3 is a longitudinal sectional elevational view of the same, taken on the plane of the line 3—3 of Fig. 2; and Fig. 4 is a partly-sectional, partly-elevational detail taken on the line 4—4 of Fig. 3.

A machine 5, for use with which this improved work holder 6 has been designed, comprises a framework 7 supporting a pair of horizontally-disposed, spaced channel bars 8 constituting the machine bed whereon are mounted the aforesaid work holder 6 and a tool-supporting head stock 9. A combined lead-screw and drive-shaft 10 is journaled between the channel bars 8 and extends from the rear end of the framework 7 up to a point adjacent the head stock 9. This combination lead-screw and drive-shaft 10 is driven by a motor 11 connected thereto through the medium of conventional reduction-gear and speed-control mechanism 12.

This improved form of work holder 6 comprises a housing 13 mounted for movement on the channel bars 8 and supporting a rotating work clamp 14 and a shiftable feed-screw connecting-member 15 which are simultaneously actuated by a cam mechanism 16 to grip a piece of work 17 (see Fig. 1) and connect the work holder 6 with the combination feed-screw and drive-shaft 10 so as to advance the work 17 toward the head stock 9. A tool (not shown) of a character suitable for performing the desired operation on the work 17 is mountable on the head stock 9.

The work-holder housing 13 is in the form of an arcuate-shaped, hollow casting or base having the lateral portions 18 thereof recessed to provide races 19 for the rollers 20 which support the work holder 6 for travel along the channel bars 8. Front and rear end plates or caps 21 and 22 are secured to the axial ends of the housing 13 to complete an enclosure for the work clamp 14 and for the cam mechanism 16.

The work clamp 14 comprises a spindle 23 journaled on bearings 24 and driven by gearing 25, wherein is arranged a collet 26 connected to an axially-shiftable sleeve 27 for movement into and out of contracting engagement with an internally-tapered bushing 28.

The spindle 23 mounts a collar 29 which is connected to the sleeve 27 by a pin 30 extending through a slot 31.

The bearings 24 here shown are of the roller type.

The gearing 25 comprises a gear 32 connected to a pinion 33 through the medium of an idle gear 34. The gear 32 is journaled on the housing 13 and suitably splined to the combination lead-screw and drive-shaft 10 so that it rotates with, as it moves along, the shaft 10. The pinion 33 is keyed to the end of the spindle 23 and held in place by a nut 35.

The collet 26 is of more or less standard construction being provided with axially-disposed slits 36 which permit the several sections of the exteriorly-tapered end to be drawn together to clamp the work within the collet, when the collet is drawn inwardly against the tapered bore 37 of the bushing 28.

The sleeve 27 is connected at its outer end to the collet 26, as shown at 38, and is normally urged by a spring 39, interposed between the inner end of the sleeve 27 and a spindle shoulder 40, to retract the collet 26 from the tapered bore 37 of the bushing 28 so that the collet is normally expanded to receive a piece of work 17.

The work-holder advancing means 15 comprises a block 41, the upper end of which is shaped to slide between the lateral side parts 18 of the housing 13. At its lower end the block 41 is formed to provide an arcuate-shaped cap 42 threaded to engage the combination feed-screw and drive-shaft 10. Transverse flanges 43 slidingly support the block 41 on posts 44 connected to the housing 13. Springs 45, interposed between the flanges 43 and washers 46 supported by nuts 47 on the lower ends of the posts 44, normally retract the block 41 so as to disengage the threaded cap 42 from the combination feed-screw and drive-shaft 10. Obviously, the nuts 47 permit a tensioning of the springs 45 to secure just the right depression of the block 41, under the action of the cam mechanism 16 to ensure the proper contact of the cap 42 with the threaded shaft 10.

The cam mechanism 16 comprises an eccentric 48, a cam ring 49, a thrust bearing 50, actuating pins 51, and a lever 52 mounting a knob 53 on its outer end.

The eccentric 48 is rotatably mounted on the spindle 23 so that a slightly less than ninety-degree rotation will shift the block 41 of the work-advancing means 15 against the action of the springs 45 to bring the threaded cap 42 into meshing engagement with the combination lead-screw and drive-shaft 10.

The cam ring 49 is provided with a number of cam surfaces 54 (see Fig. 4) in the face thereof, which is opposed to the eccentric 48. Between these cam surfaces 54 and the thrust bearing 50 the several pins 51 are interposed. A bolt 55 extending through a slot in the housing 13 and secured to the cam ring 49 permits an annular adjustment of the ring 49 to ensure the correct amount of retraction of the sleeve 27 to properly bind the work 17 in the collet 26.

The thrust bearing 50, preferably a roller bearing, is mounted on the spindle 23 adjacent the collar 32.

The pins 51 are slidably mounted in pockets in the eccentric 48. Their inner rounded ends abut the cam surfaces 54 on the ring 49 and with their rear ends abut the thrust bearing 50. Thus, when the eccentric 48 is rotated to depress the block 41 to connect the threaded cap 42 with the combination lead-screw and drive-shaft 10 the pins 51 are forced by the cam surfaces 54 to shift the sleeve 27 against the action of the spring 39, thereby drawing the collet 26 inwardly and causing the tapered bore 37 on the bushing 28 to bind the collet 26 to a piece of work 17.

The lever 52 is connected to the eccentric 48 and extends out through a slot 56 in the housing 13 which permits an angular movement of the eccentric 48 between the extreme positions indicated by the dotted and full outline shown in Fig. 2.

The work holder, herein shown and described, is used in the following manner:

Normally, the lever 52 would be shifted to the left of Fig. 2 to position the eccentric 48 so as to permit the spring 39 to retract the collet 26 from the tapered bore 37 of the bushing 28 and permit the springs 45 to retract the cap 42 of the block 41 from meshing engagement with the combination lead-screw and drive-shaft 10. A piece of work 17 thereupon could be inserted, generally from the rear end of the spindle 23, through the collet 26 and into operative relationship with the head stock 9. The work 17 being positioned for proper action of the forming tool on the head stock 9, the lever 52 would be swung into the position shown in full lines in Fig. 2. This would rotate the eccentric 48, causing a simultaneous depression of the block 15 against the springs 45 and an axial retraction of the collet 26, as previously indicated. The axial movement of the block 15 would bring the threaded cap 42 into meshing engagement with the threaded shaft 10 at the same instant that the collet 26 was brought into full gripping engagement with the work 17. Thereupon, the work holder 6 would be advanced along the channel bars 8 to feed the work 17 to the forming tool on the head stock 9. At the same time the gearing 25 would rotate the work 17, when the forming operation on the work requires it. When the work holder has moved up to the head stock the lever 52 is manually shifted in the opposite direction whereupon the reverse rotation of the eccentric 48 retracts the cap 42, on the block 15, from engagement with the shaft 10 and releases the collet 26 from the work 17. Thereupon the work holder 6 is free to be shifted to the opposite end of the framework 2 for a repetition of the above described operation.

Variations and modifications in the details of structure and arrangement of the parts may be resorted to within the spirit and coverage of the appended claims.

I claim:

1. A device of the class described comprising, a supporting frame, a housing mounted to traverse said frame, a threaded shaft journaled on said frame, means for rotating said shaft, an axially-shiftable collet mounted on said housing, a radially-shiftable screw-engaging member mounted on said housing and adapted for meshing engagement with said shaft, an eccentric mounted on said housing concentrically with said collet and contacting said member so that the rotation of said eccentric shifts said member radially of said shaft into meshing engagement therewith, a collar connected to said collet, a cam surface on said housing, means axially-shiftable on said eccentric and interposed between said cam surface and said collar whereby a rotation of said eccentric causes an axial shifting of said collet for gripping a piece of work to said housing simultaneously with the shifting of said member to engage said shaft, and a manually operable lever connected to said eccentric for rotating the same.

2. A device of the class described comprising, a supporting frame, a housing mounted to traverse said frame, a threaded shaft journaled on said frame, means for rotating said shaft, an axially-shiftable collet mounted on said housing, a radially-shiftable screw-engaging member mounted on said housing and adapted for meshing engagement with said shaft, an eccentric mounted on said housing concentrically of said collet and engaging said member so that the rotation of said eccentric effects radial shifting of said member to operatively engage said shaft, a thrust bearing connected to said collet, a plurality of cam surfaces formed on the face of said housing opposing said eccentric, pins axially-shiftable on said eccentric and interposed between said thrust bearing and said cam surface whereby the rotation of said eccentric effects an axial shifting of said collet to grip a piece of work thereto simultaneously with the shifting of said member to engage said shaft, and a manually operable lever connected to shift said eccentric.

3. A device of the class described comprising, a supporting frame, a housing mounted to traverse said frame, a threaded shaft journaled on said frame, means for rotating said shaft, an axially-shiftable collet mounted on said housing, a radially-shiftable screw-engaging member mounted on said housing and adapted for meshing engagement with said shaft, resilient means normally retracting said collet from engagement with a piece of work, other resilient means normally retracting said screw-engaging member, a cam element rotatably mounted on said housing having parts thereof adapted to actuate said collet and said member whereby the rotation of said cam element simultaneously shifts said collet against the action of said first-mentioned resilient means to engage a piece of work and shifts said member against the action of said other resilient means into meshing engagement with said threaded shaft, and a manually operable lever connected to actuate said cam element.

4. A device of the class described comprising, a supporting frame, a housing mounted to traverse said frame, a lead-screw shaft journaled on said frame, means for rotating said shaft, a spindle journaled on said housing, gearing connecting said spindle with said shaft to effect the rotation of said spindle, a sleeve slidably mounted in said spindle, a collet connected to said sleeve and movable into and out of contact with a tapered bore on said spindle, a collar mounted for axial movement on said spindle, means connecting said collar with said sleeve to cause said sleeve and collar to move in unison, a radially-shiftable lead-screw engaging member mounted on said housing, an eccentric mounted on said spindle and engaging said member so that the rotation of said eccentric effects a shifting of said member radially of said spindle into meshing engagement with said lead-screw shaft, a thrust bearing mounted on said spindle in abutment with said collar, a plurality of cam surfaces formed on the face of said housing opposing said eccentric, pins axially-shiftable on said eccentric and interposed between said thrust bearing and said cam surfaces so that the rotation of said eccentric effects an axial shifting of said sleeve to cause said collet to grip a piece of work thereto simultaneously with the shifting of said member into meshing engagement with said lead-screw shaft, and a manually operable lever connected to shift said eccentric.

5. A device of the class described comprising, a supporting frame, a housing mounted to traverse said frame, a lead-screw shaft journaled on said frame, means for rotating said shaft, a spindle journaled on said housing, gearing connecting said spindle with said shaft to effect the rotation of said spindle, a sleeve slidably mounted in said spindle, a collet connected to said sleeve and movable into and out of contact with a tapered bore on said spindle, a collar mounted for axial movement on said spindle, means connecting said collar with said sleeve to cause said sleeve and collar to move in unison, a radially-shiftable lead-screw engaging member mounted on said housing, an eccentric mounted on said spindle and engaging said member so that the rotation of said eccentric effects a shifting of said member radially of said spindle into meshing engagement with said lead-screw shaft, a thrust bearing mounted on said spindle in abutment with said collar, a cam ring mounted on said housing concentrically of said spindle, a plurality of cam surfaces formed on the face of said ring opposing said eccentric, pins axially-shiftable on said eccentric and interposed between said thrust bearing and said cam surfaces so that the rotation of said eccentric effects an axial shifting of said sleeve to cause said collet to grip a piece of work thereto simultaneously with the shifting of said member into meshing engagement with said lead-screw shaft, means for rotatably adjusting said cam ring on said spindle, and a manually operable lever connected to shift said eccentric.

6. A device of the class described comprising, a supporting frame, a housing mounted to traverse said frame, housing-advancing means associated with said frame, a clamp on said housing shiftable into and out of position to secure a piece of work to said housing, a member on said housing shiftable into and out of position to engage said housing-advancing means, cam surfaces axially and radially disposed with respect to said clamp and member, means including a rotatably-mounted element interposed between said cam surfaces whereby the rotation of said element simultaneously shifts said clamp into engagement with a piece of work and shifts said member into engagement with said housing-advancing means, and a manually operable lever connected to actuate said cam element.

7. A device of the class described comprising, a supporting frame, a housing mounted to traverse said frame, a threaded shaft journaled on said frame, means for rotating said shaft, an axially-shiftable collet mounted on said housing, a radially-shiftable screw-engaging member mounted on said housing and adapted for meshing engagement with said shaft, cam surfaces axially and radially disposed with respect to said shaft and collet, means including a rotatably-mounted element interposed between said cam surfaces whereby the rotation of said element simultaneously shifts said collet to grip a piece of work and shifts said member into meshing engagement with said threaded shaft, and a manually operable lever connected to actuate said element.

JOHN G. ZUMMACH.

References Cited in the file of this patent

UNITED STATES PATENTS

| Number | Name | Date |
|---|---|---|
| 725,779 | Schellenbach | Apr. 21, 1903 |
| 811,411 | Koons | Jan. 30, 1906 |
| 826,835 | Crump et al. | July 24, 1906 |
| 1,019,542 | Smith | Mar. 5, 1912 |
| 1,140,463 | Jung | May 25, 1915 |
| 1,241,258 | Hawthorne | Sept. 25, 1917 |
| 2,319,963 | Wilson et al. | May 25, 1943 |
| 2,343,914 | Lloyd | Mar. 14, 1944 |
| 2,376,476 | Chatelain | May 22, 1945 |